(12) United States Patent
Zeng et al.

(10) Patent No.: US 9,199,668 B2
(45) Date of Patent: Dec. 1, 2015

(54) PATH PLANNING FOR EVASIVE STEERING MANEUVER EMPLOYING A VIRTUAL POTENTIAL FIELD TECHNIQUE

(71) Applicant: GM GLOBAL TECHNOLOGY OPERATIONS LLC, Detroit, MI (US)

(72) Inventors: Shuqing Zeng, Sterling Heights, MI (US); Nikolai K. Moshchuk, Grosse Pointe, MI (US); Rouhollah Jafari, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 64 days.

(21) Appl. No.: 14/065,279

(22) Filed: Oct. 28, 2013

(65) Prior Publication Data
US 2015/0120138 A1    Apr. 30, 2015

(51) Int. Cl.
| A01B 69/00 | (2006.01) |
| B62D 15/02 | (2006.01) |
| G01S 17/93 | (2006.01) |
| G01S 15/93 | (2006.01) |
| G01S 7/48  | (2006.01) |
| G01S 13/93 | (2006.01) |

(52) U.S. Cl.
CPC .......... B62D 15/0265 (2013.01); G01S 7/4808 (2013.01); G01S 13/931 (2013.01); G01S 15/931 (2013.01); G01S 17/936 (2013.01)

(58) Field of Classification Search
CPC ....... G01S 5/14; G01S 17/936; G01S 15/931; G01S 7/4808; G01S 13/931; G08G 1/16; B62D 15/0265
USPC ...................... 701/24, 41, 117, 301, 532, 300
See application file for complete search history.

(56) References Cited

U.S. PATENT DOCUMENTS

| 8,401,782 B2 | 3/2013 | Eidehall |
| 8,527,172 B2 | 9/2013 | Moshchuk |
| 2007/0219720 A1* | 9/2007 | Trepagnier et al. ........... 701/300 |

(Continued)

FOREIGN PATENT DOCUMENTS

KR     2012-0013057 A    2/2012

OTHER PUBLICATIONS

Moshchuk, Nikolai, "Optimal Braking and Steering Control for Active Safety" International IEEE Conference on Intelligent Transportation Systems, Anchorage, Alaska, USA Sep. 16-19, 2012, pp. 1741-1746.

*Primary Examiner* — Gertrude Arthur Jeanglaude
*Assistant Examiner* — Luke Huynh
(74) *Attorney, Agent, or Firm* — John A. Miller; Miller IP Group, PLC

(57) ABSTRACT

A system and method for calculating a virtual target path that is used to calculate an evasive steering path around a target object, such as a target vehicle, stopped in front of a subject vehicle. The method includes determining a potential field using a plurality of scan points that is a summation of two-dimensional Gaussian functions, where each Gaussian function has center defined by target object scan points and other object scan points. The method identifies a mesh grid in an X-Y plane where the mesh grid includes mesh grid points at locations where X and Y plane lines cross. The method identifies a local minimum point of the potential field for each X-plane line at each mesh grid point along the Y-plane crossing that X-plane line, where the local minimum point is a curve point. The method then connects the curve points to define the target path.

19 Claims, 10 Drawing Sheets

(56) References Cited

U.S. PATENT DOCUMENTS

| | | | |
|---|---|---|---|
| 2008/0027647 A1* | 1/2008 | Ansell et al. | 701/301 |
| 2008/0300787 A1* | 12/2008 | Zeng | 701/301 |
| 2010/0076685 A1* | 3/2010 | Eidehall | 701/301 |
| 2013/0030651 A1 | 1/2013 | Moshchuk | |
| 2013/0054128 A1* | 2/2013 | Moshchuk et al. | 701/301 |

* cited by examiner

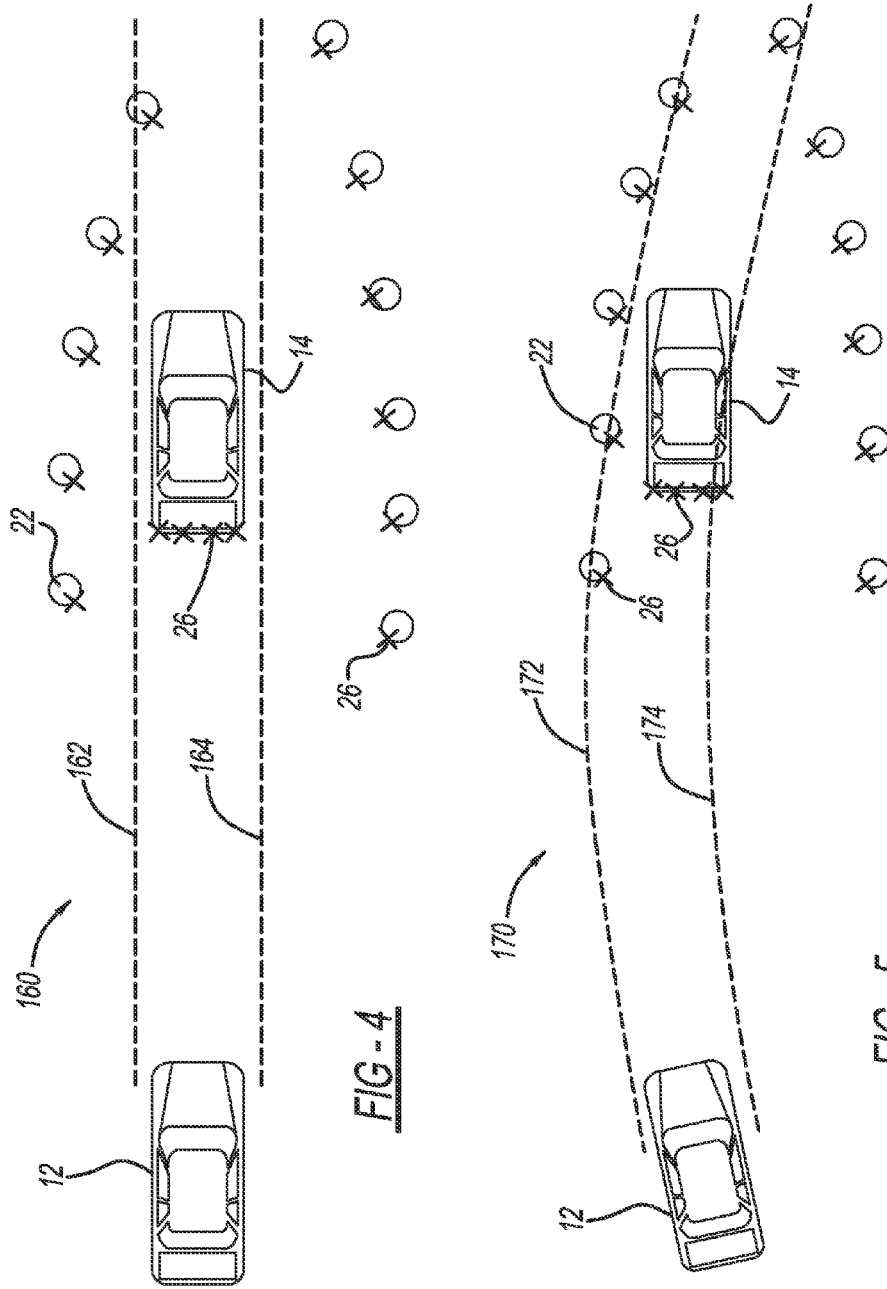

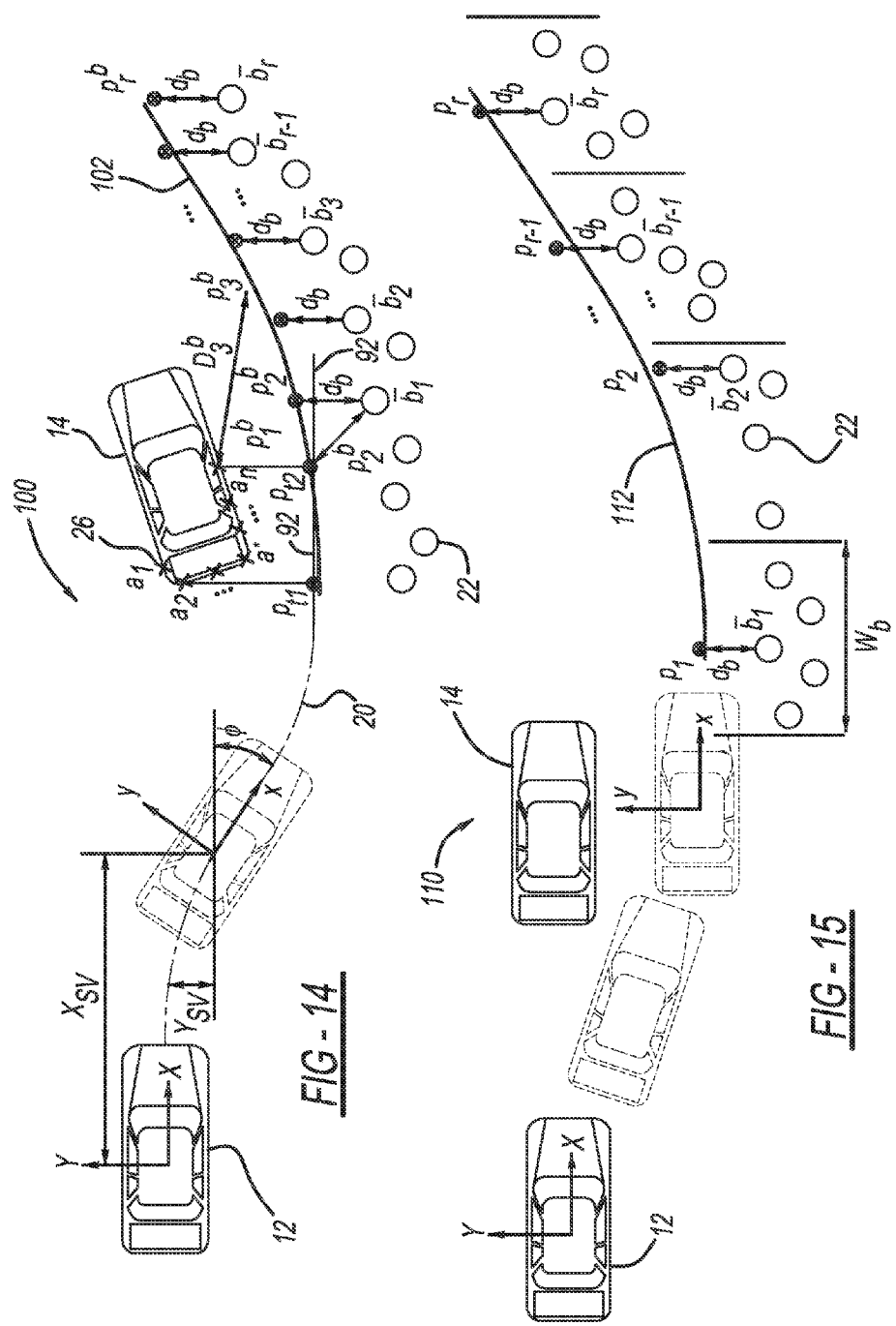

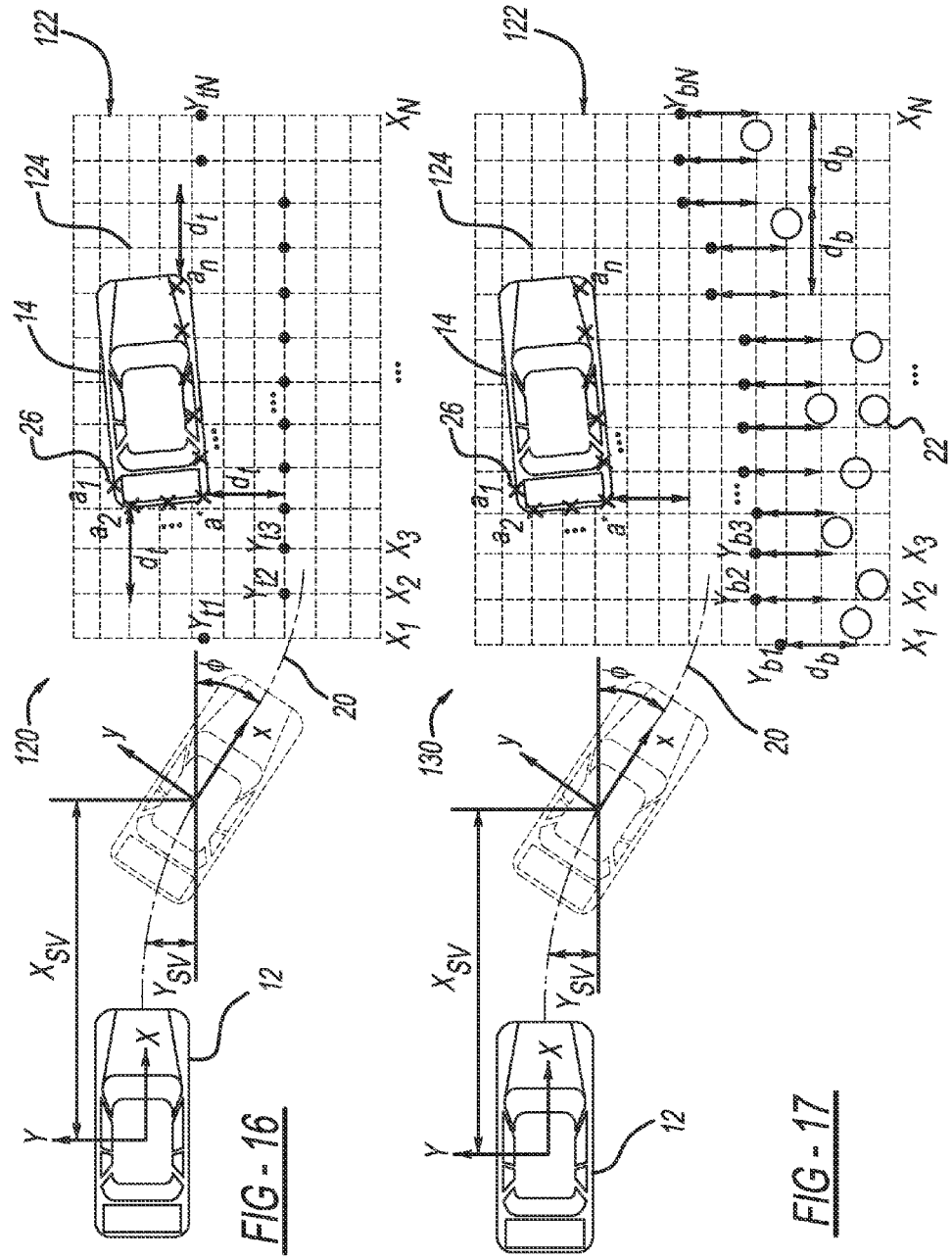

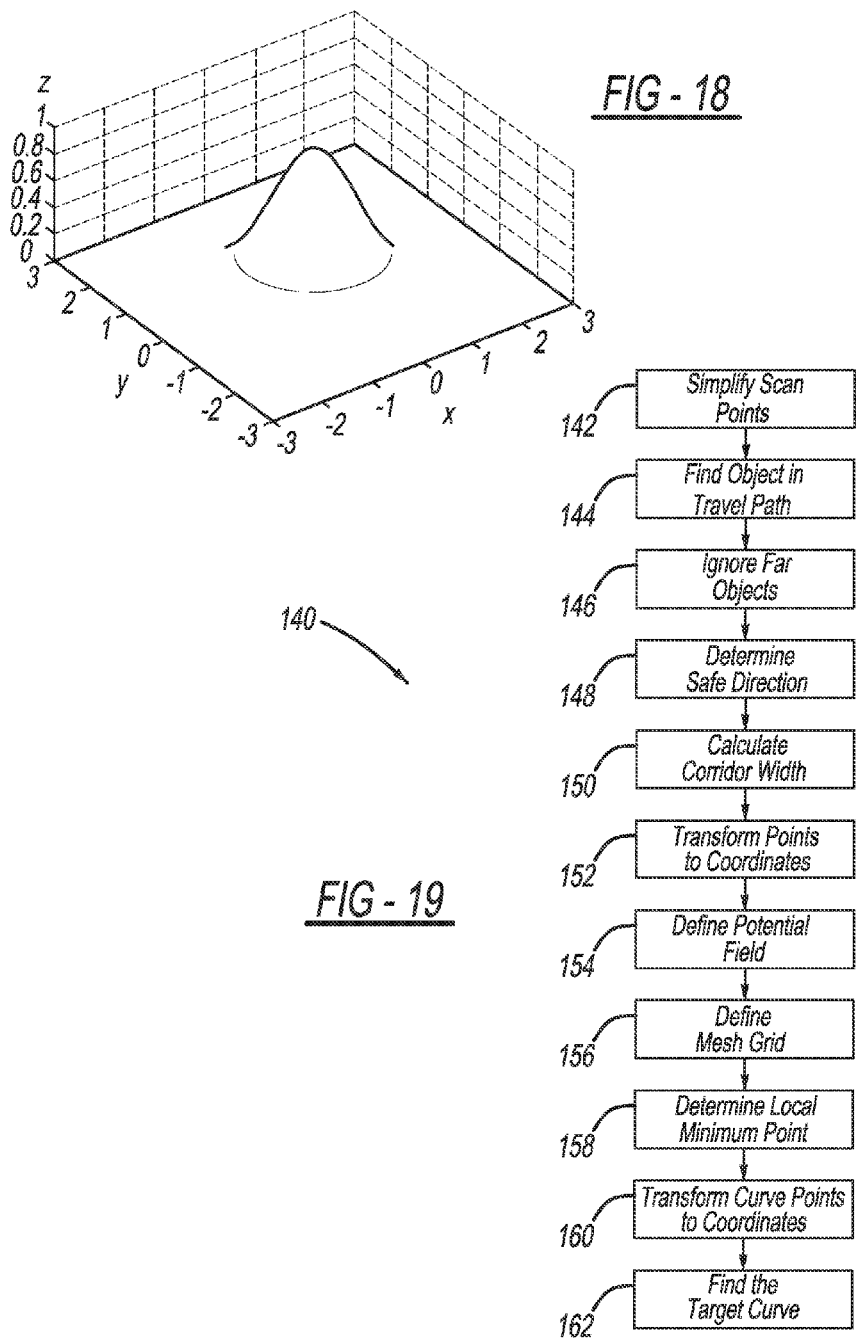

PATH PLANNING FOR EVASIVE STEERING MANEUVER EMPLOYING A VIRTUAL POTENTIAL FIELD TECHNIQUE

BACKGROUND OF THE INVENTION

1. Field of the Invention

This invention relates generally to a system and method for determining a virtual target path around an object in front of a subject vehicle and, more particularly, to a system and method for determining a virtual target path evasive steering path around a target vehicle in front of a subject vehicle that uses a potential field process employing a quadratic polynomial function.

2. Discussion of the Related Art

Modern vehicles sometimes include a collision avoidance system that employs object detection sensors that are used to enable collision warning or avoidance and other active safety applications. Various collision avoidance systems and/or adaptive cruise control systems of this type are known in the art that provide automatic vehicle control, such as braking, if a potential or imminent collision with another vehicle or object is detected, and also may provide a warning to allow the driver to take corrective measures to prevent the collision. For example, adaptive cruise control systems are known that employ a forward looking sensor, such as a radar or LiDAR sensor, that provides automatic speed control and/or braking if the vehicle is approaching another vehicle. Also, collision avoidance systems are known that employ sensors for determining if a collision with an object may be imminent that may provide automatic vehicle braking even if the vehicle operator is controlling the vehicle.

The object detection sensors for these types of systems may use any of a number of technologies, such as short range radar, long range radar, cameras with image processing, laser or LiDAR, ultrasound, etc. The object detection sensors detect vehicles and other objects in the path of a subject vehicle, and the application software uses the object detection information to provide warnings or take actions as appropriate. The warning can be a visual indication on the vehicles instrument panel or in a head-up display (HUD), and/or can be an audio warning or other haptic feedback device, such as haptic seat. In many vehicles, the object detection sensors are integrated directly into the front bumper or other fascia of the vehicle.

These types of systems often employ long-range sensors that have a narrow field-of-view in the near-field of the vehicle. Particularly, the sensor signals emanate from a point source on the vehicle and extend in the forward direction of the vehicle, typically to about 150 meters. The collision warning system transmits a radar or laser beam forward of the vehicle and processes reflections from objects in front of the vehicle. The system generates measurements from the reflections and assesses the potential for a collision based on the vehicle's speed, direction relative to the objects, road surface conditions, etc.

Radar and LiDAR sensors that are sometimes employed on vehicles to detect objects around the vehicle and provide a range to and orientation of those objects provide reflections from the objects as multiple scan points that combine as a point cluster range map, where a separate scan point is provided for every ½° across the field-of-view of the sensor. Therefore, if a target vehicle or other object is detected in front of the subject vehicle, there may be multiple scan points that are returned that identify the distance of the target vehicle from the subject vehicle. By providing a cluster of scan return points, objects having various and arbitrary shapes, such as trucks, trailers, bicycle, pedestrian, guard rail, K-barrier, etc., can be more readily detected, where the bigger and/or closer the object to the subject vehicle the more scan points are provided.

Heretofore, collision avoidance systems have generally been limited to systems that provide automatic braking in the event that the vehicle driver does not take evasive action in time to prevent a collision. However, collision avoidance systems of this type may benefit from providing combined automatic braking and steering to avoid a collision.

U.S. patent application Ser. No. 12/908,699, titled, Vehicle Collision Avoidance and Warning System, filed Oct. 20, 2010, assigned to the assignee of this application and herein incorporated by reference, discloses a collision avoidance system that employs combined automated braking and steering. The collision avoidance system defines first, second, third and fourth thresholds that identify a time to collision with a target vehicle by a subject vehicle that are based on the speed of the subject vehicle, the acceleration of the subject vehicle, the speed of the target vehicle, the acceleration of the target vehicle, the distance to the target vehicle from the subject vehicle and a coefficient of friction of the roadway on which the subject vehicle and the target vehicle are traveling, where the first threshold is greater than the second threshold, the second threshold is greater than the third threshold and the third threshold is greater than the fourth threshold. The collision avoidance system determines if the time to collision is less than the first threshold, and if so, initiates a collision warning. The collision avoidance system also determines if the time to collision is less than the second threshold if the time to collision is less than the first threshold, and if so, provides limited automatic braking of the subject vehicle. The collision avoidance system also determines if the time to collision is less than the third threshold if the time to collision is less than the second threshold, and if so, check the condition of whether a roadway lane adjacent to the subject vehicle is clear. The collision avoidance system provides full automatic collision avoidance braking if the time to collision is less than the third threshold and the lane adjacent to the subject vehicle is not clear. The collision avoidance system also determines if the time to collision is less than the fourth threshold if the time to collision is less than the third threshold and the lane adjacent to the subject vehicle is clear. The collision avoidance system provides both automatic steering and braking of the subject vehicle if the time to collision is less than the fourth threshold and the lane adjacent to the subject vehicle is clear.

As discussed above, collision avoidance systems are known in the art for providing automatic steering of a subject vehicle to avoid a slower or stopped object in front of the subject vehicle in the event that the vehicle driver does not take evasive action on his own. The collision avoidance systems provide warnings to the vehicle driver and depending on whether the driver takes evasive action, may provide automatic braking and/or automatic steering. If the system determines that automatic steering is necessary to avoid a collision, the system must calculate a safe steering path for the subject vehicle to provide the steering control. Some of those systems are able to detect lane markings so as to calculate the steering path of the subject vehicle to make a lane change for collision avoidance purposes. Those collision avoidance systems also provide steering commands that cause the subject vehicle to follow the calculated steering path to provide the vehicle steering. For example, U.S. patent application Ser. No. 12/399,317, titled, Model Based Predictive Control for Automated Lane Centering/Changing Control Systems, discloses a system and method for providing steering control for lane changing or lane centering purposes in an autonomous or semi-autonomous vehicle driven system. However, there remains a need to calculate an evasive steering path in these types of collision avoidance systems where lane markings for adjacent lanes are not present for collision avoidance purposes.

SUMMARY OF THE INVENTION

In accordance with the teachings of the present invention, a system and method are discloses for calculating a virtual target path that is used to calculate an evasive steering path around a target object, such as a target vehicle, stopped in front of a subject vehicle. The method includes providing a plurality of scan points identifying detected objects from one or more sensors on the subject vehicle and separating the plurality of scan points into target object scan points received from a target object and other object scan points received from other objects, if they exist. The method includes determining a potential field using the plurality of scan points that is a summation of two-dimensional Gaussian functions, where each Gaussian function has a center defined by the target object scan points and the other object scan points. The method identifies a mesh grid in an X-Y plane and in a predefined region where the steering path will be located where the mesh grid includes mesh grid points at locations where X and Y plane lines cross, and where X plane lines are in a direction of the travel path of the subject vehicle and Y plane lines are in a perpendicular direction to the X direction. The method identifies a local minimum point of the potential field for each X-plane line at each mesh grid point along the Y-plane line crossing that X-plane line, where the local minimum point is a curve point and where each X-plane line includes a curve point. The method then connects the curve points to define the target path by fitting a quadratic polynomial function through the points using a least-square method.

Additional features of the present invention will become apparent from the following description and appended claims, taken in conjunction with the accompanying drawings.

BRIEF DESCRIPTION OF THE DRAWINGS

FIG. 4 is an illustration showing straight path lines for a subject vehicle traveling in a straight path;

FIG. 5 is an illustration showing curved path lines for a subject vehicle traveling in a curved path;

FIG. 14 is an illustration showing a subject vehicle making an evasive path maneuver around a target vehicle that is curved relative to other objects;

FIG. 15 is an illustration of a subject vehicle making an evasive path maneuver around objects after it has passed a target vehicle;

FIG. 16 is an illustration of a subject vehicle making an evasive path maneuver around a target vehicle using a virtual potential field process and determining a target limit;

FIG. 17 is an illustration of a subject vehicle making an evasive path maneuver around a target vehicle using a virtual potential field process and determining an object limit;

FIG. 18 is an example of a two-dimensional Gaussian function; and

FIG. 19 is a flow chart diagram showing a process for determining an evasive steering path using the virtual potential field method.

DETAILED DESCRIPTION OF THE EMBODIMENTS

The following discussion of the embodiments of the invention directed to a system and method for determining a virtual target path around a target object in front of a subject vehicle for collision avoidance purposes is merely exemplary in nature, and is in no way intended to limit the invention or its applications or uses.

As will be discussed in detail below, the present invention proposes two techniques employing algorithms for determining a virtual target path that is used to find an evasive steering path around a stopped or slower object in front of a subject vehicle for collision avoidance purposes that do not use the detection of lane markings on the roadway. The two algorithms are based on a geometric method and a virtual potential field method both employing a quadratic polynomial function. It is noted that although the present invention does not include or discuss automatic braking to avoid a collision with an object, automatic barking would likely be used in combination with the automatic evasive steering in the collision avoidance system that the invention is part of. It is also noted that the present invention also does not include or discuss providing a steering command to the vehicle steering system to follow the evasive steering path. However, providing such a command would also be part of the collision avoidance system that the invention is part of.

Figure 1:
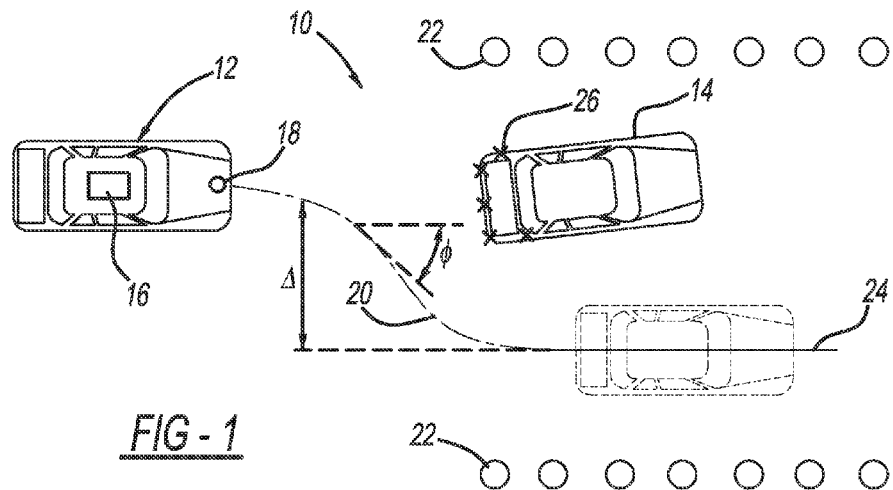
FIG. 1 is an illustration of a subject vehicle behind a target vehicle and showing an evasive steering path for the subject vehicle to travel around the target vehicle for collision avoidance purposes.

FIG. 1 is an illustration 10 showing a subject vehicle 12 traveling behind a target vehicle 14, where the target vehicle 14 is traveling slower than the subject vehicle 12 or is stopped. The target vehicle 14 is intended to represent any object in front of the subject vehicle 12 that is within a collision path of the travel direction of the subject vehicle 12. It is noted that the reference numbers 12 and 14 will be used for the subject vehicle and the target vehicle, respectively, in other figures throughout the discussion below. The subject vehicle 12 includes a collision avoidance system 16 that is operable to perform the various calculations and operations including determining a virtual target path as discussed herein. The collision avoidance system 16 receives sensor signals from one or more sensors, represented generally as sensor 18, which can be any suitable sensor for the purposes discussed herein, such as radar, LiDAR, camera, ultrasonic sensors, etc. For this invention, the system 16 will typically use data scan points from a LiDAR sensor provided on the subject vehicle 12, where the data scan points are also represented as scan points 26 from all of the objects, but only shown on the target vehicle 14. The data scan points are converted to a data scan point cluster map in a manner well understood by those skilled in the art. Providing a data scan point cluster from detected objects using a LiDAR sensor is well known to those skilled in the art, see, for example, U.S. patent application Ser. No. 13/901,123, titled, Probabilistic Target Selection and Threat Assessment Method and Application to Intersection Collision Alert System, filed May 23, 2013, assigned to the assignee of this application and herein incorporated by reference.

The collision avoidance system 16 uses the scan points 26 from the LiDAR sensor 18 to detect the target vehicle 14, and if necessary, determines an evasive steering path 20 around the target vehicle 14 while avoiding other objects 22, such as construction barrels, guard rails, trees, signs, etc., in the event that the vehicle driver does not take suitable evasive action on his own in a safe amount of time. The collision avoidance system 16 uses a virtual target path 24 to find the evasive steering path 20. As will be discussed in detail below, the virtual target path 24 is calculated to allow the subject vehicle 12 to be a safe distance from the target vehicle 14 when the subject vehicle 12 passes the target vehicle 14 and also a safe distance from the objects 22 if they exist. If the objects 22 do not exist, or are a far enough distance away from the target vehicle 14, then the virtual target path 24 will be parallel to the subject vehicle direction before the evasive maneuver. If the objects 22 are close enough to the target vehicle 14 where they present a collision issue, then the virtual target path 24 may be a curved path. In this particular discussion, there are no lane markings for the sensor 18 to detect to identifying a lane adjacent to the target vehicle 14 that the vehicle 12 can turn in to. The collision avoidance system 16 will detect the objects 22 on both sides of the target vehicle 14 and based on those objects will determine what side of the target vehicle 14 provides the safest evasive steering path for the subject vehicle 12.

Figure 2:
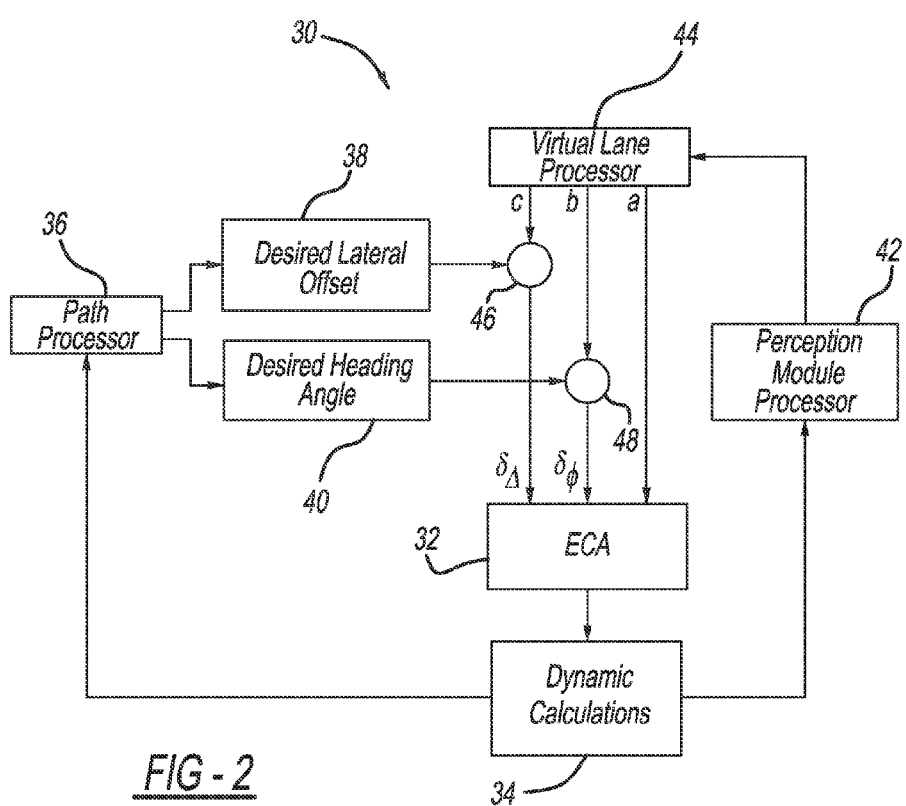
FIG. 2 is a block diagram of a process illustrating the calculation and implementation of an evasive steering maneuver.

FIG. 2 is a schematic block diagram of a collision avoidance system 30 that can be used as the system 16 on the subject vehicle 12. The system 30 includes an enhanced collision avoidance (ECA) controller 32 that provides a steering command to the subject vehicle 12 where vehicle dynamic calculations are provided by a processor 34, which provides the distance value D, which is the distance between the subject vehicle 12 and the target vehicle 14 to a lane change path processor 36. The processor 36 uses the virtual target path coefficients a, b and c provide by a virtual lane processor to calculate the evasive steering path 20 if the distance D in conjunction with the relative speed between the subject vehicle 12 and the target vehicle 14 requires an evasive steering action to be taken. If the evasive steering path 20 is to be determined, the processor 36 provides a desired lateral offset Δ at box 38 and a desired heading angle Φ at box 40 for the subject vehicle 12 to define the path 20, see FIG. 1. A LiDAR sensor included in the processor 34 provides the data scan point map to a perception module processor 42 that processes the data and provides sensor data fusion, object detection, object tracking, etc. Those skilled in the art will readily recognize processors and algorithms that process data, images and information from various types of sensors and other signals and combine that information to detect and monitor objects both stationary and moving around the subject vehicle 12. The processed data scan point information is provided to a virtual lane processor 44 that outputs the values a, b and c for a quadratic polynomial function to define the virtual target path 24 in a manner that will be discussed in detail below. The value c is subtracted from the lateral offset value Δ in a comparator 46 to provide a change in the desired lateral offset $\delta_\Delta$, and the value b is subtracted from the desired heading Φ in a comparator 48 to generate a change in the desired heading $\delta_\Phi$ to provide the changes for the steering path 20, which are provided to the ECA controller 32.

Figure 3:
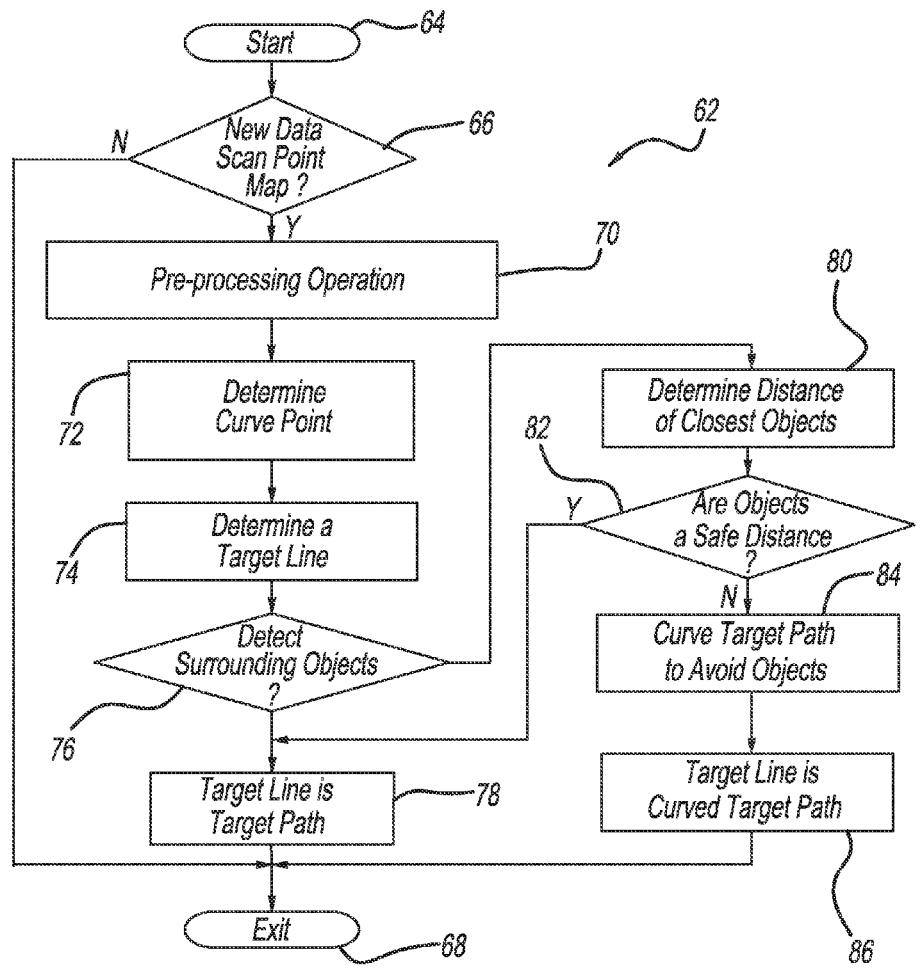
FIG. 3 is a flow chart diagram showing a process for determining a virtual target path using the geometry method.

FIG. 3 is a flow chart diagram 62 showing a process for determining the virtual target path 24 using the geometric algorithm. It is noted that before the geometric collision avoidance analysis and calculations are performed, the system 30 has already determined that a collision risk is possible or likely based on other algorithms and controls that monitor the speed and position of the subject vehicle 12 and the target vehicle 14. It is further noted that the operation of the flow chart diagram 62 is performed in the virtual lane processor 44. The algorithm starts at block 64 and then determines whether a new data scan point map from the perception module processor 42 has been received at decision diamond 66, and if not, exits the algorithm at block 68. If a new data scan point map has been received at the decision diamond 66, then the algorithm proceeds to box 70 to perform pre-processing steps on the scan cluster data points. The pre-processing operation performs many functions including determining which data points are from the target vehicle 14, which data points are from the other objects 22, what those objects are, etc. Based on the determination of which data points represent what objects and their location relative to the subject vehicle 12, the algorithm determines in the pre-processing operation what is the best or safest side of the target vehicle 14 for the virtual target path 24 so that the subject vehicle 12 can more safely avoid the target vehicle 14.

The following discussion describes a method to detect the target vehicle 14 from a set of all objects detected by the LiDAR sensor 18 at the box 70. Two different scenarios are considered based on the travel path of the subject vehicle 12.

For the first scenario the subject vehicle 12 is travelling in a straight path, where it is assumed that the yaw rate of the subject vehicle 12 is very small, i.e., $|\omega_{SV}|$<TBD. FIG. 4 is an illustration 160 showing the subject vehicle 12 following the target vehicle 14 along a path defined by straight lines 162 and 164. The travel path of the subject vehicle 12 is defined in global coordinates as:

$$Y_{L1}(X)=Y_{SV}+(X-X_{SV})\tan\theta_{SV}+W/2, \quad (1)$$

$$Y_{L2}(X)=Y_{SV}+(X-X_{SV})\tan\theta_{SV}-W/2, \quad (2)$$

where $(X_{SV}, Y_{SV})$ and $\theta_{SV}$ represent the position and the heading of the subject vehicle 12 in the global coordinates, respectively, and W is the width of the subject vehicle 12.

Once the lines 162 and 164 are calculated, all of the scan points 26 are identified that lie inside the region defined by the path lines 162 and 164, i.e., those points 26 that satisfy the following inequality:

$$Y_{L2}(X_{si})\leq Y_{si}\leq Y_{L1}(X_{si}), \quad (3)$$

where $(X_{si}, Y_{si})$ is the position of each scan point 26 in the global coordinates.

The illustration 160 shows the path lines 162 and 164 and the scan points 26 lying inside and outside of the defined region. Since the LiDAR sensor 18 provides the information of which of the scan points 26 belongs to which detected object 22, the number of the scan points 26 can be counted for each object 22 that lies inside the region. The object 22 with the highest number of the scan points 26 inside the defined region will be considered as the "target vehicle" for calculating the virtual target curve.

For the second scenario the subject vehicle 12 is travelling along a curved path, where it is assumed that the yaw rate of the subject vehicle 12 is greater than a threshold, i.e., $|\omega_{SV}|>$TBD. FIG. 5 is an illustration 170 showing the subject vehicle 12 following the target vehicle 14 along a curved path defined by curved lines 172 and 174. The travel path of the subject vehicle 12 at a point in time can be defined using a circular curve with the following parameters:

$$R_{cir} = V_{SV}/\omega_{SV}, \quad (4)$$

$$X_{cir} = \begin{cases} X_{SV} + R_{cir}\sin\theta_{SV} & \text{if } \omega_{SV} < 0 \\ X_{SV} - R_{cir}\sin\theta_{SV} & \text{if } \omega_{SV} > 0 \end{cases}, \quad (5)$$

$$Y_{cir} = \begin{cases} Y_{SV} - R_{cir}\cos\theta_{SV} & \text{if } \omega_{SV} < 0 \\ Y_{SV} + R_{cir}\cos\theta_{SV} & \text{if } \omega_{SV} > 0 \end{cases}, \quad (6)$$

where $V_{SV}$ is the longitudinal velocity of the subject vehicle 12, $R_{cir}$ is the radius of the circular curve and $(X_{cir}, Y_{cir})$ is the position of the circle center in the global coordinates.

Having these parameters, a region can be defined for the path of the subject vehicle 12 using the two parallel curve lines 172 and 174 on the sides of the subject vehicle 12. Similar to the first scenario, the scan points 26 are found lying inside this region by satisfying the following inequality:

$$(R_{cir}-W/2)^2 \leq (X_{si}-X_{cir})^2+(Y_{si}-Y_{cir})^2 \leq (R_{cir}+W/2)^2. \quad (7)$$

The illustration 170 shows the path curve lines 172 and 174 and the scan points 26 lying inside and outside of the defined region for this scenario. The number of the scan points 26 is counted for each object 22 that lies inside the region and the object 26 with the most number of the scan points 26 inside the region will be considered as the target vehicle 14 for calculating the virtual target curve.

Note that the above calculations for detecting the target vehicle 14 is repeated each time new scan point data is received and before the actual evasive steering maneuver is started. After the beginning of the evasive steering maneuver of the subject vehicle 12, the target vehicle 14 will always be the corresponding detected object 22 before the evasive steering maneuver. The period of time when the evasive maneuver control is activated, but the evasive steering maneuver is not started due to a large time-to-collision value, is called the "pre-processing phase."

Figure 6:
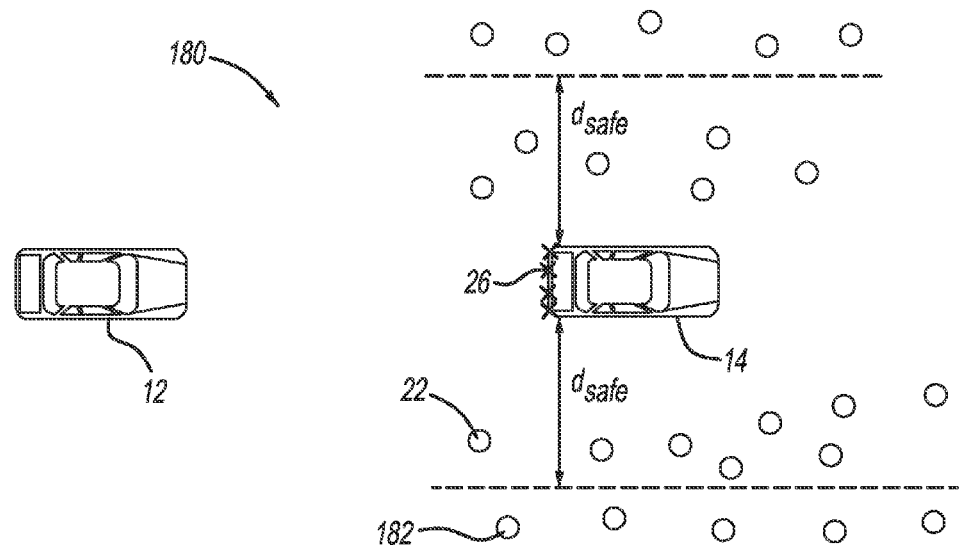
FIG. 6 is an illustration showing ignored detected objects for a calculation of a virtual target curve.

The LiDAR sensor 18 can detect side objects that are far from the target vehicle 14 and irrelevant objects around the path of the subject vehicle 12 that need to be ignored at the box 70. Those objects may include trees, houses and other irrelevant objects that will not play a role in the calculation of the virtual target curve. Therefore, it is desirable to employ a technique to ignore those distant objects. This can be simply done by defining a safe range on both sides of the target vehicle 14. FIG. 6 is an illustration 180 identifying a safe distance $d_{safe}$ beyond the target vehicle 14 where objects 182 detected outside the safe distance $d_{safe}$ are not included in the calculation of the virtual target curve. A detected object will be ignored in the calculations if any of the following conditions are met.

$$\begin{cases} b_{jY} < \min_i a_{iY} - d_{safe} \\ b_{jY} > \max_i a_{iY} + d_{safe} \end{cases} \text{ or } \quad (8)$$

for $i = 1, 2, \ldots, n, j = 1, 2, \ldots, m$, where $a_{iY}$ and $b_{jY}$ are the Y-coordinates of the target scan points and object scan points, respectively, and $d_{safe}$ is the safe corridor width defining the range outside which the detected objects are ignored.

If there are no scan points available from the target vehicle 14, for example, when the subject vehicle 12 passes the target vehicle 14, the last available scan points of the target vehicle 14 are considered for calculations in equation (8).

Figure 7:
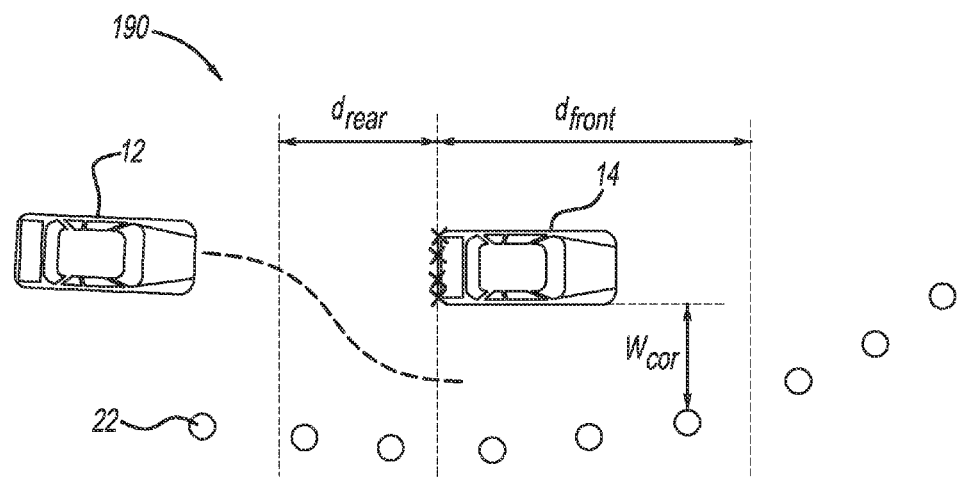
FIG. 7 is an illustration showing a calculation of a corridor width between a target vehicle and objects.

If at any instant of time, the evasive steering maneuver is found not to be safe because of insufficient space between the target vehicle 14 and the objects 22, a signal should be sent to the ECA controller 32 to stop or abort the evasive steering maneuver. FIG. 7 is an illustration 190 showing the scenario for calculating a corridor width $W_{cor}$ between the target vehicle 14 and the objects 22 to determine if the corridor width provides enough space for the evasive steering maneuver. To find the corridor width $W_{cor}$, first select those object points that lie inside a pre-defined margin that covers a distance from the rear and the front of the target vehicle 14. The selected object points inside these margins satisfy the following inequality:

$$b_j \in b^{in} \text{ if } \min_i a_{iX}-d_{safe} \leq b_{jX} \leq \max[(\max_i a_{iX}+d_{safe}),(\min_i a_{iX}+2 dsafe),$$

for $i=1,2,\ldots,n, j=1,2,\ldots,m$ \quad (9)

where $b^{in}$ is the group of the object points inside the target vehicle region. The corridor width $W_{cor}$ is then calculated as a minimum distance of the barrel points and the target vehicle 14 along the Y coordinate, more specifically:

$$W_{cor} = \begin{cases} \min_j |b_{jY} - \max_i a_{iy}| & \text{if } TD = \text{left} \\ \min_j |b_{jY} - \min_i a_{iy}| & \text{if } TD = \text{right} \end{cases}. \quad (10)$$

for $i = 1, 2, \ldots, n, b_j \in b^{in}$

If the corridor width $W_{cor}$ obtained in equation (10) is less than a safe distance, an abort signal will be sent to the ECA controller 32.

The algorithm to find the best left or right direction for the virtual target path 24 around the target vehicle 14 is described below in the following ten-step algorithm, numbered 1-10. The algorithm uses the scan points 26 from the LiDAR sensor 18 as inputs, where it is assumed that the scan points 26 from the target vehicle 14 are known. This can be achieved using different methods, such as image processing of the sensor output.

Figure 8:
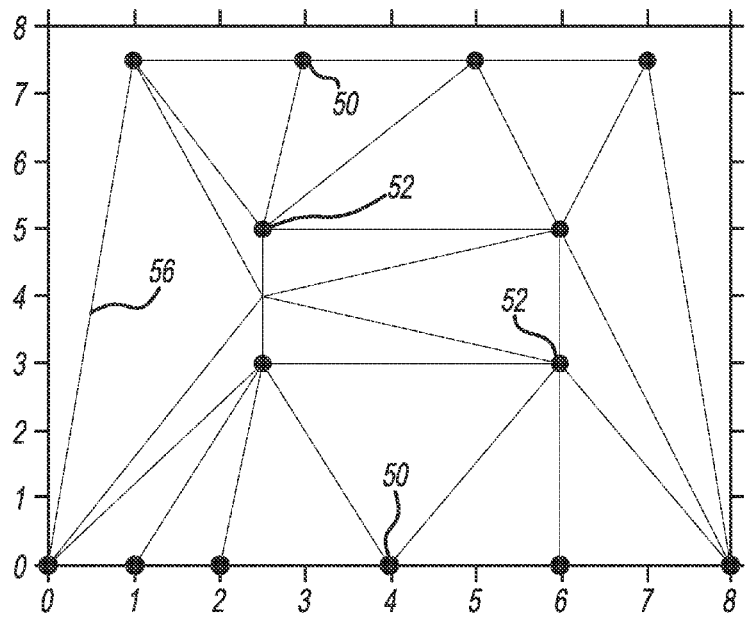
FIG. 8 is a graph showing a space representation using Delaunay triangulation.

1. Simplify the scan map using a clustering algorithm.
2. Transform the clustered scan points to global coordinates X-Y using equations (14) and (18) discussed below.
3. Represent the space between the clustered scan points by triangles using "Delaunay Triangulation," which is well known to those skilled in the art. As an example, FIG. 8 shows Delaunay Triangulation for a set of data scan points where a top and bottom row of dots 50 represent the scan points from the objects 22 and inside dots 52 represent the scan points from the target vehicle 14.

Figure 9:
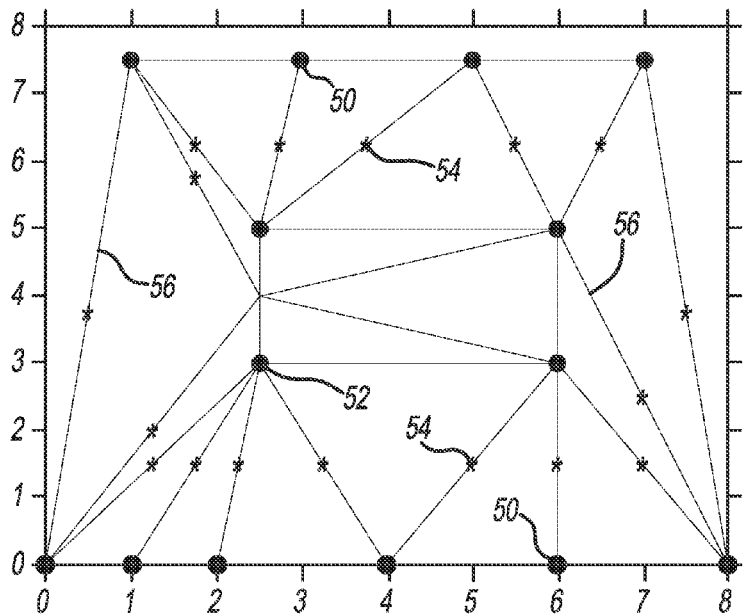
FIG. 9 is a graph showing mid-points of selected edges of Delaunay triangulation used as vertices in Dijkstra's algorithm.
Figure 10:
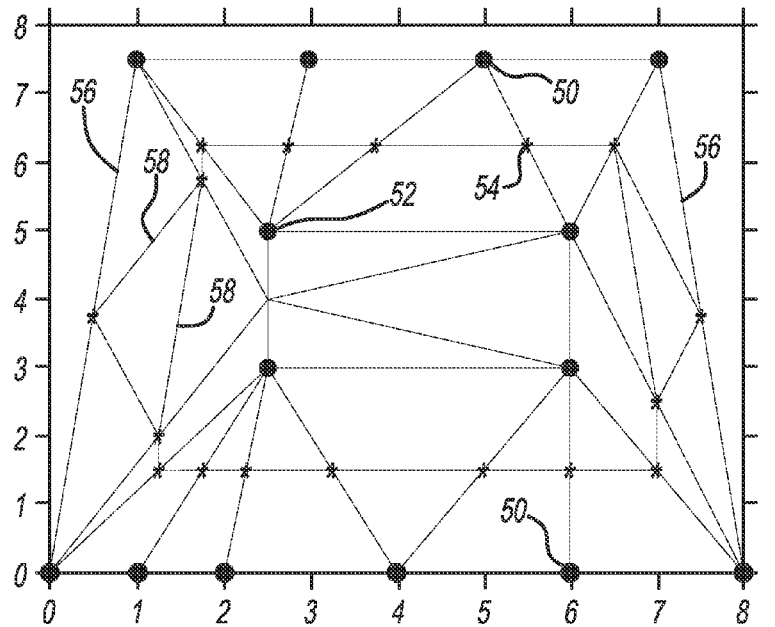
FIG. 10 is a graph showing segments connecting the vertices in Delaunay triangulation.

4. Define vertices 54, shown in FIG. 9, as the mid-point of edges 56 of the Delaunay Triangles provided that:
   a. The edge 56 does not connect two target vehicle scan points 52, and
   b. The difference along the Y-coordinate of the two scan points connected by the edge 56 is greater than a predetermined threshold T, i.e., $|S_{iY} - S_{jY}| \geq T$.
5. Define segments 58 as the lines connecting two vertices 54 that belong to the same triangle, see FIG. 10.
6. Define a graph from the vertices 54 in step 4 and the segments 58 in step 5.
7. Using "Dijkstra's algorithm," find the shortest path for the graph in step 6 based on the following start node, end node and distance functions:
   a. The start node is defined as the vertex 54 with the minimum X-coordinate value.
   b. The end node is defined as the vertex 54 with the maximum X-coordinate value.
   c. The distance for each segment 58 is comprised of three components:

$$D_k = \alpha_1 D_{k1} + \alpha_2 D_{k2} + \alpha_3 D_{k3}, k = 1, 2, \ldots, r, \quad (11)$$

where $D_{k1}$ is the length of the k-th segment 58, $D_{k2}$ is the absolute value of the slope angle of the k-th segment 58 measured from the positive X-coordinate, $D_{k3}$ is the component representing the width of the corridor between target vehicle scan points 26 and the object scan points, and the coefficients $\alpha_1, \alpha_2, \alpha_3$ represent the weights for each component of the distance function.

Figure 11:
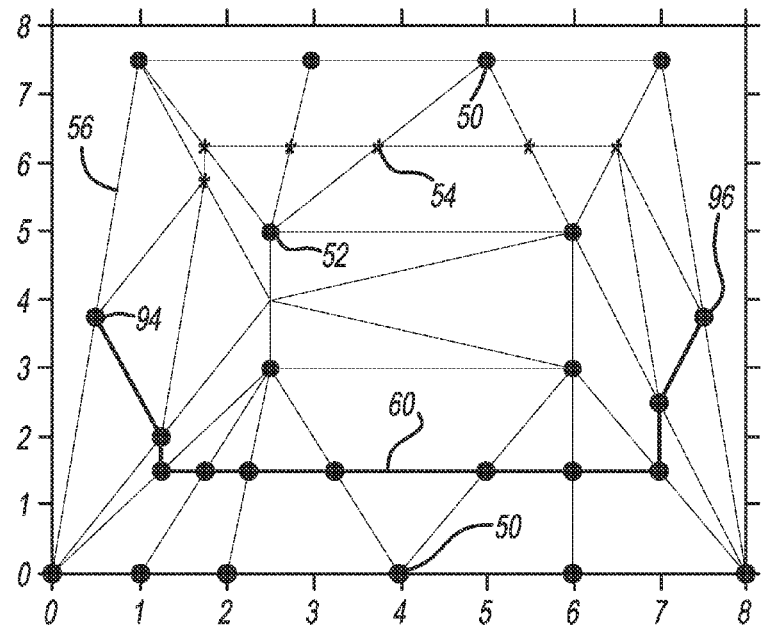
FIG. 11 is a graph of the space representation showing the shortest path using Dijkstra's algorithm.

Note that the determined shortest path is in terms of the new distance function in equation (11), and not the conventional distance between the start and end nodes. FIG. 11 shows a selected path from a start node 94 to an end node 96 along a lower path 60, which represents the virtual target path 24 on the right side of the target vehicle 14. The weight coefficients α are chosen such that the third component corresponding to the width of the corridor between the target vehicle 14 and the objects 22 plays a more significant role in determining the shortest path. In FIG. 11, for example, the lower path 60 is chosen because the lower path 60 between the target vehicle points 26 and object points is wider than the upper path.
8. Divide the scan points into left and right points based on their relative position to the shortest path, i.e., those above the path are among the left points and those below the path are among the right points.
9. If the target vehicle scan points are among the right points, the safe direction of the lane change is "left" and the non-target-vehicle scan points in the left group are considered as the object points, otherwise, the safe direction is "right" and the non-target-vehicle scan points in the right group are considered as the object points. Other scan points are ignored in determining the target curve coefficients.
10. Repeat steps 1 to 9 once there are new data scan points from the perception module processor 42.

To find the distance function $D_{k3}$ in equation (11), which corresponds to the width of the path between the target vehicle 14 and the objects 22, use the following five steps:
1. Find the vertices 54 whose X-coordinate values lie inside a range determined by the X-coordinate of the target vehicle scan points a.
2. Divide the vertices 54 obtained in step 1 into two groups whose vertices 54 are above or below the target vehicle points 26.
3. Find the corridor width corresponding to each vertex 54 in step 1 as follows:
   a. If the vertex 54 is below the target vehicle scan points a, the corridor width is calculated as the Y-coordinate difference between the minimum target vehicle point (in terms of Y-coordinate) and the minimum object point (in terms of Y-coordinate) connected to the vertex 54 through the triangle edge.
   b. If the vertex 54 is above the target vehicle scan points a, the corridor width is calculated as the Y-coordinate difference between the maximum target vehicle point (in terms of Y-coordinate) and the maximum object point (in terms of Y coordinate) connected to the vertex 54 through the triangle edge.
4. Find the minimum value of the corridor width for each group of vertices 54 and denote the group whose minimum value is lowest as a star group. If the minimum values of the groups are same, the star group does not exist.
5. The distance function $D_{k3}$ for each segment 58 is obtained as:
   a. If the segment 58 is connected to any of the vertices 54 obtained in step 1:
      i. If the vertex 54 belongs to the star group, defined in step 4, the distance function $D_{k3}$ for the segment 58 is set to a minimum corridor width of that group.
      ii. If the vertex 54 does not belong to the star group or the star group does not exist, the distance function $D_{k3}$ for the segment 58 is set to zero.
   b. If the segment 58 is not connected to any of the vertices 54 obtained in step 1, the distance function $D_{k3}$ is set to zero.

The algorithm to find the safe direction for the virtual target path 24 should start when the target vehicle 14 is detected and needs to be completed before the actual collision avoidance maneuver is started. In case the safe lane change direction varies from time-to-time due to a new set of data points, a weighted averaging method with more weights for the most recent decisions can be employed.

Figure 12:
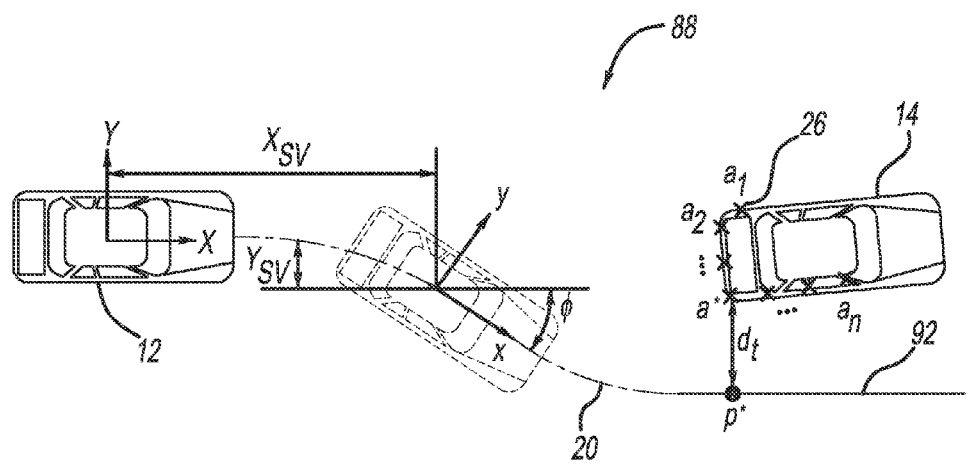
FIG. 12 is an illustration showing a subject vehicle making an evasive path maneuver around a target vehicle without other objects in the way.

Returning to FIG. 3, after the pre-processing calculations discussed above have been performed, the algorithm determines a curve point p* that is a predefined safe distance $d_t$ from the closest scan point 26 on the target vehicle 14 from the safe direction of the virtual path 24 at box 72, as shown by illustration 88 in FIG. 12, where each of the scan points 26 is designated by $a_i$ and the closest scan point on the target vehicle 14 is designated by a*. The algorithm then determines a target line 92 representing a possibility for the virtual target path 24 that is parallel to the heading of the subject vehicle 12 before starting the evasive steering maneuver and goes through the point p* at box 74.

The safe distance $d_t$ is measured from the closest scan point 26 on the target vehicle 14 to the target line 92 on the intended direction of the path change maneuver. The target line 92 can be represented in global coordinates X-Y as:

$$Y = p_Y^*, \quad (12)$$

where $p_Y^*$ denotes the Y-coordinate of the curve point p*, which is obtained as:

$$p_X^* = a_X^* \quad (13)$$
$$\begin{cases} p_Y^* = a_Y^* - d_t, a_Y^* = \min_i a_{iY} & \text{if } TD = \text{right} \\ p_Y^* = a_Y^* - d_t, a_Y^* = \max_i a_{iY} & \text{if } TD = \text{left} \end{cases}.$$

where $a_{iY}$, i=1, 2, . . . , n is the Y-coordinate of the scan points 26 on the target vehicle 14 in the global coordinates X-Y, $d_t$ is the safe distance from the target vehicle 14 and TD is the turning direction of the subject vehicle 12. Note that the global coordinates X-Y are identical to the subject vehicle coordinates x-y at the beginning of the evasive steering maneuver. The target vehicle points 26 are transformed from the subject vehicle coordinates x-y to the global coordinates X-Y as:

$$\begin{bmatrix} a_{iX} \\ a_{iY} \end{bmatrix} = \begin{bmatrix} X_{SV} \\ Y_{SV} \end{bmatrix} + \begin{bmatrix} \cos\Phi & -\sin\Phi \\ \sin\Phi & \cos\Phi \end{bmatrix} \begin{bmatrix} a_{ix} \\ a_{iy} \end{bmatrix}, \quad (14)$$

for $i = 1, 2, \ldots, n$, where $X_{SV}$ and $Y_{SV}$ denote the current position of the subject vehicle 12 relative to the global coordinates X-Y and $\Phi$ is the relative heading angle of the subject vehicle 12 measured in the counter-clockwise direction from the positive X-axis.

The target line 92 can be obtained in the subject vehicle coordinates x-y as:

$$y = -\tan(\Phi)(x - p_x^*) + p_y^*, \quad (15)$$

where:

$$\begin{bmatrix} p_x^* \\ p_y^* \end{bmatrix} = \begin{bmatrix} \cos\Phi & \sin\Phi \\ -\sin\Phi & \cos\Phi \end{bmatrix} \begin{bmatrix} p_X^* - X_{SV} \\ p_Y^* - Y_{SV} \end{bmatrix}. \quad (16)$$

The algorithm then determines if there are any detected surrounding objects at decision diamond 76. If there are no detected objects at the decision diamond 76, then the target line 92 becomes the target path 24 at box 78 and the algorithm ends at the block 68 to wait for the next scan cluster map. In other words, the target path 24 is the target line 92 that is parallel to the subject vehicle 12 at the beginning of the evasive steering maneuver and is at a safe distance $d_t$ from the target vehicle 14.

Figure 13:
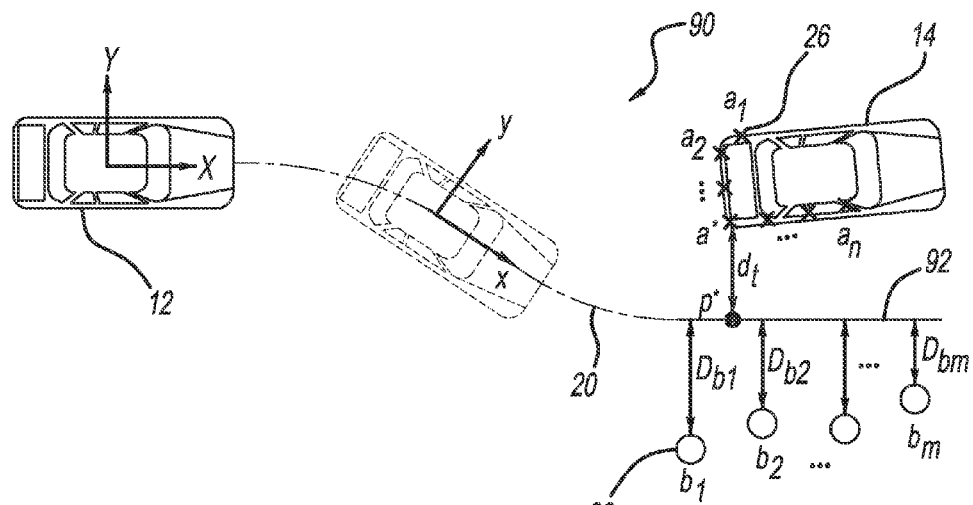
FIG. 13 is an illustration showing a subject vehicle making an evasive path maneuver between a target vehicle and other objects along a straight path.

If the algorithm does detect objects at the decision diamond 76, then the algorithm determines the distance of the closest surrounding objects 22 to the target line 92 at box 80. The distance $D_b$ from each detected object point $b_j$, $j=1, 2, \ldots, m$ to the target line 92 is then determined as shown by illustration 90 in FIG. 13. Using the line representation in equation (15), the distances $D_{bj}$ can be obtained as:

$$D_{bj} = \frac{|\tan(\Phi)b_{jx} + b_{jy} - \tan(\Phi)(p_x^* + p_y^*)|}{\sqrt{\tan^2(\Phi) + 1}}, \quad j = 1, 2, \ldots, m, \quad (17)$$

where $b_{jx}$ and $b_{jy}$ are the detected object points $b_j$ in the subject vehicle coordinates x-y.

The algorithm then determines if the object points $b_j$ are a safe distance from the target line 92 at decision diamond 82. If all of the object points $b_j$ are a safe distance from the target line 92 at the decision diamond, i.e., $\min_j(D_{bj}) \geq d_b$, the target path 24 will be the target line 92 given in equation (15) at the box 78.

If the minimum distance from any of the object points $b_j$ to the target line 92, given in equation (17), is less than the safe distance $d_b$, i.e., $\min_j(D_{bj}) < d_b$, at the decision diamond 82 the following step-by-step algorithm is used to find the target path 24 as a target path 102, which is curved to avoid the objects 22 by a safe distance, shown by illustration 100 in FIG. 14, at box 84, to create a curved target line from the curved target path at box 86.

1. Transform the detected object points $b_j$ from the subject vehicle coordinates x-y to the global coordinates X-Y as:

$$\begin{bmatrix} b_{jX} \\ b_{jY} \end{bmatrix} = \begin{bmatrix} X_{SV} \\ Y_{SV} \end{bmatrix} + \begin{bmatrix} \cos\Phi & -\sin\Phi \\ \sin\Phi & \cos\Phi \end{bmatrix} \begin{bmatrix} b_{jx} \\ b_{jy} \end{bmatrix}, \quad (18)$$

for $j = 1, 2, \ldots, m$.

2. Sort the transformed object points $b_j$ in an X-coordinate ascending order, i.e., $\hat{b} = \text{sort}_x(b)$.

3. Among the sorted object points $\hat{b}_j$, select the critical points in finding the target path 24 based on the distance from the object points $\hat{b}_j$ to the target line 92 in equation (14) and the Y-coordinate of the sorted object points $\hat{b}_j$ in the global coordinate X-Y, specifically:

a) Find the first selected point $\bar{b}_1 = \hat{b}_{j_1^*}$ whose distance to the target line 92 is less than the safe distance $d_b$.

b) Select the other critical object points $\bar{b}_k$, $k = 2, \ldots, r$ using:

$$\text{If} \begin{cases} \hat{b}_{jX} > \bar{b}_{(k-1)X} \ \& \ \hat{b}_{jY} \geq \bar{b}_{(k-1)Y} & \text{if } TD = \text{right} \\ \hat{b}_{jX} > \bar{b}_{(k-1)X} \ \& \ \hat{b}_{jY} \leq \bar{b}_{(k-1)Y} & \text{if } TD = \text{left} \end{cases} \Rightarrow (\bar{b}_k = \hat{b}_j \text{ and } j_k^* = j). \quad (19)$$

for $j_{k-1}^* < j \leq m$ and $k = 2, 3, \ldots, r$

4. Find the curve points $p_k^b$, $k = 1, 2, \ldots, r$ corresponding to the selected object points $\hat{b}_{j_k^*}$. The curve points $p_k^b$ are calculated so that they are a safe distance $d_b$, from the selected object points $\hat{b}_{j_k^*}$ along the Y-axis and are obtained as:

$$p_{kY}^b = \begin{cases} \bar{b}_{kY} + d_b & \text{if } TD = \text{right} \\ \bar{b}_{kY} - d_b & \text{if } TD = \text{left} \end{cases}, \quad (20)$$

for $k = 1, 2, \ldots, r$.
$p_{kX}^b = \bar{b}_{kX}$

5. Ignore the curve point $p_k^b$, $k = 1, 2, \ldots, r$ if its minimum distance from the target points $a_i$ is less than the safe distance $d_t$, i.e., $D_k^b < d_t$ where:

$$D_k^b = \min_i[\sqrt{(p_{kX}^b - a_{iX})^2 + (p_{kY}^b - a_{iY})^2}], i = 1, 2, \ldots, n. \quad (21)$$

6. Add the two curve points $p_1^t$ and $p_2^t$ corresponding to the target points $a_i$ as:

$$p_{1X}^t = \min_i a_{iX}, p_{1Y}^t = p_Y^*, \quad (22)$$

$$p_{2X}^t = \max_i a_{iX}, p_{2Y}^t = p_Y^*, \quad (23)$$

where $p_Y^*$ defines the target path 24 and is given in equation (13).

7. Ignore the curve point $p_k^t$, $k = 1, 2, \ldots, r$ if its minimum distance from the object points $b_j$ is less than the safe distance $d_b$, i.e., $D_K^t < d_b$, where:

$$D_k^b = \min_j[\sqrt{(p_{kX}^t - b_{jX})^2 + (p_{kY}^t - b_{jY})^2}], j = 1, 2, \ldots, m. \quad (24)$$

8. Transform the curve points $p_k$ determined in steps 4-7 to the subject vehicle coordinates x-y as:

$$\begin{bmatrix} p_x \\ p_y \end{bmatrix} = \begin{bmatrix} \cos\Phi & \sin\Phi \\ -\sin\Phi & \cos\Phi \end{bmatrix} \begin{bmatrix} p_X - X_{SV} \\ p_Y - Y_{SV} \end{bmatrix}. \quad (25)$$

9. Find the target path 102 by fitting a quadratic polynomial function, such as by using equation (26), through the transformed curve points $p_k$ in step 8, where the curve fitting is done in a least-square sense.

$$y = ax^2 + bx + c. \quad (26)$$

The following discussion provides details on how to find the coefficients of quadratic polynomial using curve-fitting method in a least-square sense. Assuming that the curve points $p_k$, $k=1, 2, \ldots, r$ are already calculated, the next step is to find a quadratic polynomial $y(x) = ax^2 + bx + c$ such that the following cost function is minimized as:

$$e = \Sigma_{k=1}^{r} [p_{ky} - y(p_{kx})]^2 + \gamma_0[a - \bar{a}]^2 + \gamma_1[b - \bar{b}]^2 + \gamma_2[c - \bar{c}]^2, \quad (27)$$

where $(p_{kx}, p_{ky})$ is the position of a curve points, $\bar{a}$, $\bar{b}$, and $\bar{c}$ are the polynomial coefficients obtained in the previous time and $\gamma_0$, $\gamma_1$ and $\gamma_2$ are some positive constants.

The first term in equation (27) ensures that resulted polynomial curve is close enough to the curve points while the other terms make sure that the resulted polynomial curve is smooth and there are not large changes in the polynomial coefficients from one instant to the next instant. To find the optimized coefficients that minimize the cost function e in equation (27), the following set of equations are solved.

$$\begin{cases} \frac{\partial e}{\partial a} = -2\sum_{k=1}^{r} [p_{ky} - y(p_{kx})](p_{kx})^2 + 2\gamma_0[a - \bar{a}] = 0 \\ \frac{\partial e}{\partial b} = -2\sum_{k=1}^{r} [p_{ky} - y(p_{kx})]p_{kx} + 2\gamma_1[b - \hat{b}] = 0 \\ \frac{\partial e}{\partial c} = -2\sum_{k=1}^{r} [p_{ky} - y(p_{kx})] + 2\gamma_2[c - \hat{c}] = 0 \end{cases} \quad (28)$$

which can be written in the following matrix form:

$$A \begin{bmatrix} a \\ b \\ c \end{bmatrix} = B, \quad (29)$$

where:

$$A = \begin{bmatrix} \sum_{k=1}^{r}(p_{kx})^4 + \gamma_0 & \sum_{k=1}^{r}(p_{kx})^3 & \sum_{k=1}^{r}(p_{kx})^2 \\ \sum_{k=1}^{r}(p_{kx})^3 & \sum_{k=1}^{r}(p_{kx})^2 + \gamma_1 & \sum_{k=1}^{r}p_{kx} \\ \sum_{k=1}^{r}(p_{kx})^2 & \sum_{k=1}^{r}p_{kx} & r + \gamma_2 \end{bmatrix}, \quad (30)$$

$$B = \begin{bmatrix} \sum_{k=1}^{r} p_{ky}(p_{kx})^2 + \gamma_0 \bar{a} \\ \sum_{k=1}^{r} p_{ky} p_{kx} + \gamma_1 \bar{b} \\ \sum_{k=1}^{r} p_{ky} + \gamma_2 \bar{c} \end{bmatrix}, \quad (31)$$

The quadratic polynomial coefficients are then obtained as:

$$\begin{bmatrix} a \\ b \\ c \end{bmatrix} = A^{-1} B. \quad (32)$$

Now consider the case where the subject vehicle 12 has passed the target vehicle 14 along the path 102 based on the discussion above and there are only object scan points $b_j$ from the objects 22 available, as shown by illustration 110 in FIG. 15. The target path 24 is calculated in this case as target path 112 and will direct the subject vehicle 12 along a path to avoid hitting the objects 22 on the road side.

To find the target path 112, first separate the object points $b_j$ into groups based on their X-coordinate values as:

$$b_j \in G_k \text{ if } (k-1)w_b \leq b_{jX} - \min_j(b_{jX}) \leq kw_b,$$

$$\text{for } j=1,2,\ldots,m \text{ and } k=1,2,\ldots,r, \quad (33)$$

where $b_j$ denotes the j-th object point, $G_k$ is the k-th group of the object points $b_j$ and $w_b$ is a constant length, which specifies the width of each group along the X-axis.

The selected object points $\bar{b}_k$ are then obtained as:

$$\bar{b}_k = b_{j_k^*}, k = 1, 2, \ldots, r, \quad (34)$$

where:

$$j_k^* = \begin{cases} \operatorname{argmax}_j(b_{jY}) \text{ for all } b_j \in G_k \text{ if } TD = \text{right} \\ \operatorname{argmin}_j(b_{jY}) \text{ for all } b_j \in G_k \text{ if } TD = \text{left} \end{cases}. \quad (35)$$

The curve points $p_k$, $k=1, 2, \ldots, r$ corresponding to the selected object points $\bar{b}_k$ are calculated so that they are a safe distance $d_b$ from the selected object points $\bar{b}_k$ along the Y-axis as:

$$p_{kY} = \begin{cases} \bar{b}_{kY} + d_b \text{ if } TD = \text{right} \\ \bar{b}_{kY} - d_b \text{ if } TD = \text{left, for } k = 1, 2, \ldots, r. \\ p_{kX} = \bar{b}_{kX} \end{cases} \quad (36)$$

The curve points $p_k$ are finally transformed to the subject vehicle coordinates x-y using equation (25) and the target path 112 is determined by fitting a quadratic polynomial function through the transformed curve points.

To summarize the geometric method discussed above, the following step-by-step algorithm is presented.

1. Collect the scan points from the LiDAR sensor 18 and simplify them using clustering algorithms.

2. From the scan points of the detected objects, find the target vehicle object that is in the travel path of the subject vehicle 12.

3. Ignore those scan points of the detected objects that are far from the target vehicle 14 and are irrelevant to the evasive lane change maneuver.

4. Based on the detected points, determine the safe direction of the emergency path change maneuver, and divide the scan points into two categories including the target vehicle points $a_j$ and the object points $b_j$, if they exist.

5. Calculate the corridor width between the target vehicle and the detected objects and send an abort signal to stop the evasive steering maneuver if the corridor width is less than a threshold.

6. Using the target vehicle points $a_j$, calculate the target line 92 given in equation (15).
7. Find the target path 24 based on the following cases:
   a. If no object points $b_j$ are detected, the target line 92 in equation (15) is the desired target path 24.
   b. For the case where there are some object points $b_j$:
      i. If the minimum distance from the object points $b_j$ to the target line 92, given in equation (17), is equal or greater than the safe distance $d_t$, the target line 92 in equation (15) is the desired target path 24.
      ii. If the minimum distance from the object points $b_j$ to the target line 92, given in equation (17), is less than the safe distance $d_t$, follow the algorithm defined above to find the target path 102.
   c. For the case where there are only object points $b_j$ and the subject vehicle 12 has passed the target vehicle 14, follow the algorithm defined above to find the target path 112.
8. Repeat steps 1-4 once there are new data scan points from the LiDAR sensor 18.

The potential field process and algorithm is also performed in the virtual lane processor 44 and uses the concept of virtual potential fields to calculate the virtual target path 24. First, the algorithm creates an artificial potential field that has large values in the target vehicle scan points $a_i$ and the object scan points $b_j$ and whose value decreases the farther from these points so that the safest location for the subject vehicle 12 between the target vehicle 14 and the objects 22 can be determined. Thus, the target path 24 will be found at the minimum value of the potential field when certain constraints are satisfied. The discussion below is made with reference to illustrations 120 and 130 in FIGS. 16 and 17, respectively, that show the subject vehicle 12, the target vehicle 14 and the evasive steering path 20.

To ensure that the virtual target path 24 is far enough from the target vehicle 14 and the objects 22 a potential field is first defined as a summation of two-dimensional Gaussian functions, one for each of the target vehicle scan points $a_i$ and the object scan points $b_j$, whose maximum occurs in each of the detected points as:

$$U(X,Y) = \Sigma_{i=1}^{n} U_i(X,Y) + \Sigma_{j=1}^{m} U_j(X,Y), \quad (37)$$

where n and m are the number of target vehicle points $a_i$, i=1, 2, ..., n, and the object points, $b_j$=1, 2, ..., m, respectively, and:

$$U_i(X, Y) = A_i \mathrm{Exp}\left[-\left(\frac{(X - a_{iX})^2}{2\sigma_{Xi}^2} + \frac{(Y - a_{iY})^2}{2\sigma_{Yi}^2}\right)\right], \quad (38)$$

$$U_j(X, Y) = A_j \mathrm{Exp}\left[-\left(\frac{(X - b_{jX})^2}{2\sigma_{Xj}^2} + \frac{(y - b_{jY})^2}{2\sigma_{Yj}^2}\right)\right], \quad (39)$$

where A is the amplitude and $\sigma_X$ and $\sigma_Y$ are X and Y spreads of the Gaussian functions. FIG. 18 is a graph in the X-Y-Z space showing an example of a two-dimensional Gaussian function.

FIG. 19 is a flow chart diagram 140 showing a process for the potential field method. The algorithm collects the scan points 26 from the LiDAR sensor 18 and simplifies the scan points 26 using a clustering algorithm at box 142. From the scan points of the detected objects, the algorithm finds the target vehicle object that is in the travel path of the subject vehicle 12 at box 144. The algorithm ignores those scan points of the detected objects that are far from the target vehicle 14 and are irrelevant to the evasive lane change maneuver at box 146. Using the detected scan points 26, the algorithm determines a safe direction for the virtual target path 24 and, divides the scan points 26 into two categories including the target vehicle points $a_i$ and the object points $b_j$, if they exist, at box 148 in the same manner as discussed above for the geometry method in the pre-processing step performed at the box 70. The algorithm calculates the corridor width between the target vehicle 14 and the detected objects and sends an abort signal to stop the evasive steering maneuver if the corridor width is less than a threshold at box 150. The algorithm transforms the detected target points $a_i$ and the object points $b_j$ to global coordinates X-Y using equations (14) and (18) at box 152, and defines the potential field using equation (37) at box 154.

The algorithm then defines a mesh grid 122 in the X-Y plane in the desired region where the target path 24 will be found, and calculates the value of the potential field at each mesh point 124 ($X_g, Y_g$), g=1, 2, ..., N at box 156. Particularly, the mesh points 124 are the locations where an X-line in the X-Y plane and a Y-line in the X-Y plane intersect, where the X-lines in the X-Y plane are in the direction of travel of the subject vehicle 12 and the Y-lines are perpendicular thereto. For each X-line $X_g$, g=1, 2, ..., N in the grid 122, the algorithm determines the local minimum point $Y_{gmin}$ of the potential field along the Y-line for that $X_g$ line in the grid 122, i.e., the mesh point 124 having the smallest or lowest potential field value in the Y-direction, which is the lowest possible point where the target vehicle 14 or the objects 22 would be located, and thus the safest location for the subject vehicle 12 during the evasive maneuver, at box 158 constrained to the following conditions:

$$\begin{cases} Y_{tg} \le Y_{gmin} \le Y_{bg} & \text{if } TD = \text{right} \\ Y_{bg} \le Y_{gmin} \le Y_{tg} & \text{if } TD = \text{left} \end{cases}, \quad (40)$$

where $Y_{tg}$ and $Y_{bg}$ are a target limit and an object limit, respectively, and are defined to ensure that the local minimum points are found in a safe region either on the desired side of the target vehicle points $a_i$ or between the target vehicle points $a_i$ and the object points $b_j$, if they exist. The illustration 120 in FIG. 16 shows details for how the target limit $Y_{tg}$ can be found and the illustration 130 in FIG. 17 shows details for how the object limit $Y_{bg}$ can be found. The determined minimum point for each X-line, if it exists, is the curve point, i.e., $p_k=(p_{kX}, p_{kY})=(X_g, Y_{gmin})$, k=1, 2, ..., r.

In equation (40), the target limit $Y_{tg}$, g=1, 2, ..., N ensures that the curve points are found in the desired side of the target vehicle 14 and are at a safe distance from the target vehicle 14, where the target limit $Y_{tg}$ is determined as:

$$Y_{tg} = \begin{cases} \begin{cases} \min_i a_{iy} - d_t & \text{if } \min_i a_{iX} - d_t \le X_g \le \\ & \max_i a_{iX} + d_t \quad \text{If } TD = \text{right} \\ \min_i a_{iY} & \text{Otherwise} \end{cases} \\ \begin{cases} \max_i a_{iy} - d_t & \text{if } \min_i a_{iX} - d_t \le X_g \le \\ & \max_i a_{iX} + d_t \quad \text{If } TD = \text{left} \\ \max_i a_{iY} & \text{Otherwise} \end{cases} \end{cases} \quad (41)$$

for g = 1, 2, ..., N

In equation (40), the object limit $Y_{bg}$, g=1, 2, ..., N ensures that the curve points are found in the desired side of the object points $b_1$ and are at a safe distance from them. To find the object limit $Y_{bg}$ at each mesh grid point 124, first find the vector of all the object points $b_j$ that are in a close interval of the mesh point $X_g$, i.e., for g=1, 2, ..., N as:

$$\hat{b}_k^g = [\hat{b}_{k-1}^g, b_j] \text{ if}$$

$$X_g - d_b \le b_{jX} \le X_g + d_b, \text{ for } j=1,2,\ldots, m \text{ \& } k=1,2,\ldots, \quad (42)$$

where $\hat{b}_0^g$ is an empty vector for all g=1, 2, ..., N.

The object limit $Y_{bg}$ is then obtained as:

$$Y_{bg} = \begin{cases} \max_k \hat{b}_{kY}^g + d_b & \text{if } TD = \text{right} \\ \min_k \hat{b}_{kY}^g - d_b & \text{if } TD = \text{left} \end{cases}, \text{ for } g = 1, 2, \ldots, N. \quad (43)$$

In the case where no object points $b_j$ are detected, the object limit $Y_{bg}$ can be determined based on the target limit $Y_{tg}$ as:

$$Y_{bg} = \begin{cases} Y_{tg} - \alpha d_t & \text{if } TD = \text{right} \\ Y_{tg} + \alpha d_t & \text{if } TD = \text{left} \end{cases}, \text{ for } g = 1, 2, \ldots, N, \quad (44)$$

where α is a positive constant that can be chosen arbitrarily and determines how close the target path 24 can be to the target vehicle 14.

The algorithm then transforms the curve points determined at the box 158 to the subject vehicle coordinates x-y using equation (25) at box 160. The algorithm finds the target curve by fitting a quadratic polynomial function through the transformed curve points at the box 160, where the curve fitting is done in a least-square sense at box 162. The algorithm then returns to the box 142 to wait for the next data point scan cluster.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining a virtual target path which is used to calculate an evasive steering path for a subject vehicle around a target object in a travel path of the subject vehicle without using lane markings, said method comprising:
   a collision avoidance system programmed for:
   providing a plurality of scan points identifying detected objects from one or more sensors on the subject vehicle;
   separating the plurality of scan points into target object scan points received from the target object and other object scan points received from other objects;
   determining a potential field using the plurality of scan points that is a summation of two-dimensional Gaussian functions, where each Gaussian function has a center defined by the target object scan points and the other object scan points;
   identifying a mesh grid in an X-Y plane and in a predefined region where the steering path will be located where the mesh grid includes mesh grid points at locations where X and Y plane lines cross, and where X plane lines are in a direction of the travel path of the subject vehicle and Y plane lines are in a perpendicular direction to the X direction;
   identifying a potential field value from the potential field at each mesh grid point;
   identifying a local minimum point of the potential field for each X plane line at each mesh grid point along a Y plane line crosses that X plane line, where the local minimum point is a curve point and where each X plane line includes a curve point;
   calculating a corridor width between the target object and other objects and using the corridor width as a weight coefficient to determine an optimal virtual target path such that a path with a wider corridor width is preferred over a path with a narrow corridor width; and
   connecting the curve points to define the virtual target path.

2. The method according to claim 1 wherein determining a potential field that is a summation of the two-dimensional Gaussian functions includes using:

$$U(X,Y) = \Sigma_{i=1}^n U_i(X,Y) + \Sigma_{j=1}^m U_j(X,Y),$$

where U(X, Y) is the potential field, n and m are the number of target object points $a_i$, i=1, 2, ..., n, and the object points, $b_j$, j=1, 2, ..., m, respectively, and:

$$U_i(X, Y) = A_i \exp\left[-\left(\frac{(X - a_{iX})^2}{2\sigma_{Xi}^2} + \frac{(Y - a_{iY})^2}{2\sigma_{Yi}^2}\right)\right],$$

$$U_j(X, Y) = A_j \exp\left[-\left(\frac{(X - b_{jX})^2}{2\sigma_{Xj}^2} + \frac{(y - b_{jY})^2}{2\sigma_{Yj}^2}\right)\right],$$

where A is the amplitude and $\sigma_X$ and $\sigma_Y$ are X and Y spreads of the Gaussian function.

3. The method according to claim 1 wherein identifying a local minimum point of the potential field includes using:

$$\begin{cases} Y_{tg} \le Y_{gmin} \le Y_{bg} & \text{if } TD = \text{right} \\ Y_{bg} \le Y_{gmin} \le Y_{tg} & \text{if } TD = \text{left} \end{cases},$$

where T D is subject vehicle turning direction, $Y_{gmin}$ is the local minimum potential field value, and $Y_{tg}$ and $Y_{bg}$ are a target limit and an object limit, respectively, and are defined to ensure that the local minimum points are found in a safe region either on a desired side of the target object points $a_i$ or between the target object points $a_i$ and the other object points $b_j$.

4. The method according to claim 3 wherein the identifying a local minimum point of the potential field also includes using:

$$Y_{tg} =$$

$$\begin{cases} \begin{cases} \min_i a_{iY} - d_t & \text{if } \min_i a_{iX} - d_t \leq X_g \leq \max_i a_{iX} + d_t \\ \min_i a_{iY} & \text{Otherwise} \end{cases} & \text{If } TD = \text{right} \\ \begin{cases} \max_i a_{iY} - d_t & \text{if } \min_i a_{iX} - d_t \leq X_g \leq \max_i a_{iX} + d_t \\ \max_i a_{iY} & \text{Otherwise} \end{cases} & \text{If } TD = \text{left} \end{cases}$$

for $g = 1, 2, \ldots, N$ where $a_i$ are the target object scan points, $X_g$ is the X coordinate of a mesh grid point, and $d_t$ is a predetermined target safe distance.

5. The method according to claim 4 wherein identifying a local minimum point of the potential field also includes using:

$$\hat{b}_k^g = [\hat{b}_{k-1}^g, b_j] \text{ if}$$

$$X_g - d_b \leq b_{jX} \leq X_g + d_b,$$

for $j = 1, 2, \ldots, m$ & $k = 1, 2, \ldots,$ $$Y_{bg} = \begin{cases} \max_k \hat{b}_{kY} + d_b & \text{if } TD = \text{right} \\ \min_k \hat{b}_{kY} - d_b & \text{if } TD = \text{left} \end{cases}, \text{ for } g = 1, 2, \ldots, N$$

where $\hat{b}$ is a vector of scan points of the other objects and $d_b$ is a predetermined object safe distance.

6. The method according to claim 1 wherein connecting the curve points to define the virtual target path includes fitting a quadratic polynomial function through the points using a least-square process.

7. The method according to claim 1 further comprising reducing the complexity of the plurality of scan points using a clustering algorithm before the scan points are separated into the target object scan points and the other object scan points.

8. The method according to claim 1 further comprising ignoring scan points that are outside of a predetermined safe distance from the subject vehicle.

9. The method according to claim 1 further comprising detecting a target vehicle as the target object from the other objects.

10. The method according to claim 1 wherein calculating a corridor width between the target object and the other objects includes aborting an evasive steering maneuver if the corridor width is less than a predetermined threshold width.

11. The method according to claim 1 wherein the at least one sensor is at least one LiDAR sensor.

12. A method for determining a virtual target path that is used to calculate an evasive steering path for a subject vehicle around a target vehicle in a travel path of the subject vehicle without using lane markings, said method comprising:

a collision avoidance system programmed for:

providing a plurality of scan points identifying detected objects from one or more LiDAR sensors on the subject vehicle;

separating the plurality of scan points into target vehicle scan points received from the target vehicle and other object scan points received from other objects;

determining a potential field using the plurality of scan points that is a summation of two-dimensional Gaussian functions, where each Gaussian function has a center defined by the target vehicle scan points and the other object scan points;

identifying a mesh grid in an X-Y plane and in a predefined region where the steering path will be located where the mesh grid includes mesh grid points at locations where X and Y plane lines cross, and where X plane lines are in a direction of the travel path of the subject vehicle and Y plane lines are in a perpendicular direction to the X direction;

identifying a potential field value from the potential field at each mesh grid point;

identifying a local minimum point of the potential field for each X plane line at each mesh grid point along a Y plane line that crosses the X plane line, where the local minimum point is a curve point and where each X plane line includes a curve point;

calculating a corridor width between the target object and other objects and using the corridor width as a weight coefficient to determine an optimal virtual target path such that a path with a wider corridor width is preferred over a path with a narrow corridor width; and connecting the curve points to define the virtual target path by fitting a quadratic polynomial function through the points using a least-square process.

13. The method according to claim 12 wherein determining a potential field that is a summation of the two-dimensional Gaussian functions includes using:

$$U(X,Y) = \Sigma_{i=1}^n U_i(X,Y) + \Sigma_{j=1}^m U_j(X,Y),$$

where $U(X, Y)$ is the potential field, n and m are the number of target object points $a_i$, $i=1, 2, \ldots, n$, and the object points, $b_j$, $j=1, 2, \ldots, m$, respectively, and:

$$U_i(X, Y) = A_i \text{Exp}\left[-\left(\frac{(X - a_{iX})^2}{2\sigma_{Xi}^2} + \frac{(Y - a_{iY})^2}{2\sigma_{Yi}^2}\right)\right],$$

$$U_j(X, Y) = A_j \text{Exp}\left[-\left(\frac{(X - b_{iX})^2}{2\sigma_{Xj}^2} + \frac{(y - b_{jY})^2}{2\sigma_{Yj}^2}\right)\right],$$

where A is the amplitude and $\sigma_X$ and $\sigma_Y$ are X and Y spreads of the Gaussian function.

14. The method according to claim 12 wherein identifying a local minimum point of the potential field includes using:

$$\begin{cases} Y_{tg} \leq Y_{gmin} \leq Y_{bg} & \text{if } TD = \text{right} \\ Y_{bg} \leq Y_{gmin} \leq Y_{tg} & \text{if } TD = \text{left} \end{cases},$$

where T D is subject vehicle turning direction, $Y_{gmin}$ is the local minimum potential field value, and $Y_{tg}$ and $Y_{bg}$ are a target limit and an object limit, respectively, and are defined to ensure that the local minimum points are found in a safe region either on a desired side of the target vehicle points $a_i$ or between the target vehicle points $a_i$ and the other object points $b_j$.

15. The method according to claim 14 wherein the identifying a local minimum point of the potential field also includes using:

$$Y_{tg} = \begin{cases} \begin{cases} \min_i a_{iy} - d_t & \text{if } \min_i a_{iX} - d_t \le X_g \le \max_i a_{iX} + d_t \\ \min_i a_{iY} & \text{Otherwise} \end{cases} & \text{If } TD = \text{right} \\ \begin{cases} \max_i a_{iy} - d_t & \text{if } \min_i a_{iX} - d_t \le X_g \le \max_i a_{iX} + d_t \\ \max_i a_{iY} & \text{Otherwise} \end{cases} & \text{If } TD = \text{left} \end{cases}$$

for $g = 1, 2, \ldots, N$ where $a_i$ are the target vehicle scan points, $X_g$ is the X direction potential field value at a mesh grid point, and $d_t$ is a predetermined target safe distance.

16. The method according to claim 15 wherein identifying a local minimum point of the potential field also includes using:

$$\hat{b}_k^g = [\hat{b}_{k-1}^g, b_j] \text{ if}$$
$$X_g - d_b \le b_{jX} \le X_g + d_b,$$

-continued for $j = 1, 2, \ldots, m \ \& \ k = 1, 2, \ldots,$ $$Y_{bg} = \begin{cases} \max_k \hat{b}_{kY} + d_b & \text{if } TD = \text{right} \\ \min_k \hat{b}_{kY} - d_b & \text{if } TD = \text{left} \end{cases},$$

for $g = 1, 2, \ldots, N$ where $\hat{b}$ is a vector of the scan points of the other objects and $d_b$ is a predetermined object safe distance.

17. The method according to claim 12 further comprising ignoring scan points that are outside of a predetermined safe distance from the subject vehicle.

18. The method according to claim 12 further comprising detecting a target vehicle as the target object from the other objects.

19. The method according to claim 12 wherein calculating a corridor width between the target object and the other objects includes aborting an evasive steering maneuver if the corridor width is less than a predetermined threshold width.

\* \* \* \* \*